United States Patent [19]

Hüttlin

[11] Patent Number: 4,645,520

[45] Date of Patent: Feb. 24, 1987

[54] FILTER ASSEMBLY FOR DUST REMOVAL FROM GASES, ESPECIALLY IN FLUIDIZED BED APPARATUS

[76] Inventor: Herbert Hüttlin, Daimlerstrasse 7, D-7853 Steinen, Fed. Rep. of Germany

[21] Appl. No.: 718,889

[22] Filed: Apr. 2, 1985

[30] Foreign Application Priority Data

Jul. 20, 1984 [EP] European Pat. Off. ........ 84108620

[51] Int. Cl.$^4$ .............................................. B01D 46/04
[52] U.S. Cl. ........................................ 55/302; 55/508
[58] Field of Search .................. 55/96, 302, 493, 495, 55/508, 510

[56] References Cited

U.S. PATENT DOCUMENTS

| | | | |
|---|---|---|---|
| 3,167,415 | 1/1965 | Edwards | 55/302 |
| 3,880,968 | 4/1975 | Kaspar et al. | 55/385 R X |
| 4,280,826 | 7/1981 | Johnson | 55/302 |
| 4,353,722 | 10/1982 | Berz | 55/96 X |

FOREIGN PATENT DOCUMENTS

| | | | |
|---|---|---|---|
| 0119309 | 12/1944 | Australia | 55/302 |
| 1122929 | 2/1962 | Fed. Rep. of Germany | |
| 1906526 | 5/1972 | Fed. Rep. of Germany | |
| 0041129 | 10/1980 | Japan | 55/302 |
| 0982749 | 12/1982 | U.S.S.R. | 55/302 |

OTHER PUBLICATIONS

Abstract No. 49483C/28 J01, Soviet Inventions Illustrated, Aug. 20, 1980.

*Primary Examiner*—Charles Hart
*Attorney, Agent, or Firm*—Brumbaugh, Graves, Donohue & Raymond

[57] ABSTRACT

The filter assembly consists of a plurality of filter cartridges (30) each including a supporting ring (32) and a filter hose (36) connected to the same. At the end remote from the supporting ring (32) they are closed by a dish-like deflecting member (40). Each filter cartridge (30) contains an immersion tube (56) arranged coaxially with the filter hose (36) and terminating slightly spaced from a central bottom portion of the deflecting member (40). The immersion tube (56) is connected to a gas conduit (46) by means of which a gas may be introduced. Together with a piston (84) guided in the immersion tube (56) and at least one spring (34;88) the deflecting member (40) constitutes a system which is adapted to vibrate and periodically tightens the filter hose (36). In this manner the filter hose (36) may be cleaned of dust both thoroughly and carefully.

36 Claims, 5 Drawing Figures

FILTER ASSEMBLY FOR DUST REMOVAL FROM GASES, ESPECIALLY IN FLUIDIZED BED APPARATUS

The invention relates to a filter assembly for dust removal from gases, especially in fluidized bed apparatus, comprising at least one filter cartridge including a supporting ring and a filter hose which is attached to the same, and being closed at its end remote from the supporting ring, and at least one gas conduit by way of which a gas may be introduced through the supporting ring into the filter cartridge for pneumatic dust removal from the filter hose.

Fluidized bed apparatus are known in which a partition defining the top of a treatment chamber carries a filter assembly of the kind specified. A plurality of filter cartridges, such as three are provided and their supporting rings having external threads are threaded into corresponding threaded bores formed in the partition. The gas conduit extends above the partition and terminates in nozzles which are disposed centrically in the area of the supporting ring of each filter cartridge and directed vertically downwards. From time to time air is blown through the nozzles into the filter cartridges in order to remove any dust deposits from the outside of their filter hoses.

Yet it is difficult and in some cases impossible to meter the quantity and pressure of the air used for dust removal such that, on the one hand, the filter hose is reliably cleared of dust and, on the other hand, the filter hose is not caused to burst by the impacts of the air introduced. In the case of the known arrangements the flow path of the air inside the filter cartridge following the free issuing of air in the range of the supporting ring depends on uncontrollable coincidental circumstances, especially so if a return flow starts from the closed end of the filter cartridge and collides with the flow exiting from the nozzle.

It is, therefore, the object of the invention to develop a filter assembly of the kind specified initially such that dust can be removed more thoroughly and, at the same time, more carefully than before from the or each filter hose.

This object is met, in accordance with the invention, in that, for each filter cartridge, an immersion tube is connected to the gas conduit and extends in the filter cartridge into the vicinity of the closed end thereof.

In accordance with the invention the gas used for dust removal—usually dry air at a pressure in the order of from 2 to 8 bars—does not become free until it has reached the end of the immersion tube, in other words in the vicinity of the closed end of the filter cartridge. This is the location where it exits and flows in the annular space between the immersion tube and the filter hose towards the supporting ring through which it leaves the filter cartridge. This establishes an orderly flow of air along the filter hose and the action thereof on the filter hose is predictable and can be determined in accordance with the respective operational requirements, such as by selecting the diameter of the immersion tube with respect to the diameter of the filter hose. The cross section of the filter hose may vary, for instance, it may be of circular or stellar configuration.

Preferably the immersion tube is arranged to be coaxial with the filter hose as this will provide an especially uniform flow of the gas from the closed end of the filter cartridge in the direction of the supporting ring. Yet in certain cases an eccentric arrangement of the immersion tube may be convenient, for example, if dust deposits of varying thickness are to be expected when the filter cartridge is not disposed vertically.

Moreover, it may be convenient for the immersion tube to flare like a trumpet toward the closed end of the filter cartridge. In such an immersion tube the entering gas will expand gradually and is easier to deflect downstream of the immersion tube so that it will flow back uniformly distributed around the immersion tube to the supporting ring.

The invention may be developed further in that the immersion tube is connected to an elastic bellows arranged in the area of the supporting ring and adapted to be blown up by the gas introduced into the immersion tube. If, at the beginning of the cleaning cycle, the gas is introduced more or less by impacts, it will quickly blow up the elastic bellows which thus will constrict up to a greater or smaller degree the annular cross section between the bellows and the supporting ring. Momentarily it may even block the same entirely. In this manner the return flow of the gas through the supporting ring may be throttled or interrupted momentarily. As a consequence, the filter hose will be blown up substantially uniformly along the full length of the filter cartridge so that it can shake off any adhering dust.

It is especially advantageous to position a deflecting member which is dimensionally stable opposite the immersion tube at the closed end of the filter cartridge. In this manner the gas introduced through the immersion tube can be deflected so uniformly that the filter hose will be cleared reliably of any deposits also in the range of the closed end of the filter cartridge.

Conveniently the deflecting member is connected to the supporting ring by a cage which is rigid in radial direction and which supports the filter hose. The cage may be designed to be rigid also in axial direction so as to retain the deflecting member in relation to the immersion tube.

However, it is likewise possible simply to suspend the deflecting member from the filter hose, provided the latter is sufficiently resistant to tearing and the filter cartridge on the whole is disposed at least approximately vertically. In this manner gas introduced from time to time by more or less impact through the immersion tube will cause sudden tightening of the filter hose whereby the latter is freed even of rather firmly adhering deposits of the type of filter cakes.

It is especially advantageous if a helical spring forms the cage and is encased in corrugated fashion by the filter hose and if the deflecting member is axially reciprocable with respect to the immersion tube. A cage of such design will prevent the filter hose from collapsing under any operational condition, while it affords sufficient freedom for the deflecting member to swing in axial direction. Hereby the filter hose is alternately tightened and released so that any deposits will be shaken off rapidly and thoroughly.

Preferably, the deflecting member is guided for limited axial displacement at the immersion tube.

In this context it is also convenient to use a cylindrical immersion tube and to connect the deflecting member firmly to a piston which is supported sealingly in the immersion tube when the deflecting member is in an inoperative position but which permits gas to flow out through the immersion tube when the deflecting member has been moved out of its inoperative position by a certain distance in the sense of an expansion of the filter hose. In this manner the gas introduced from time to time into the immersion tube will be dammed up momentarily until it displaces the piston, thus moving the deflecting member away from the end of the immersion tube whereby the filter hose is tightened. The gas which then instantaneously exists the immersion tube causes sudden blow-up of the filter hose and thus contributes still further to the removal of any adhering filtering residue.

The piston preferably can be moved entirely out of the immersion tube.

It is especially advantageous if the piston together with the deflecting member and at least one spring constitutes a system which is adapted to vibrate. If sufficiently elastic the filter hose itself may serve as the spring element.

Preferably the deflecting member is embodied by a dish disposed coaxially with the immersion tube. If such a deflecting member is provided, the gas issuing from the immersion tube may be deflected substantially without the formation of vortices so that the desired uniform annular flow is obtained. The deflection may be improved still further if the deflecting member has a central bottom area formed with a taper which is directed axially toward the immersion tube.

The further development of providing the deflecting member with an at least approximately cylindrical outer jacket portion contributes further to the vortex-free deflection and to the formation of the desired annular flow. Together with an end portion of the immersion tube this jacket portion defines an annular gap.

Furthermore, in case of the provision of a plurality of filter cartridges it is advantageous to connect the immersion tubes of all filter cartridges by a valve each to the gas conduit and to control the valves such that gas is fed cyclically to successive immersion tubes while the remaining filter cartridges continue to operate in normal fashion.

A separate pressure reservoir connected directly upstream of the respective valve may be associated with each individual immersion tube. Upon opening of the associated valve, it will permit a sudden flush of gas out through the immersion tube.

The invention will be described further, by way of example, with reference to the accompanying drawings, in which.

Figure 1:
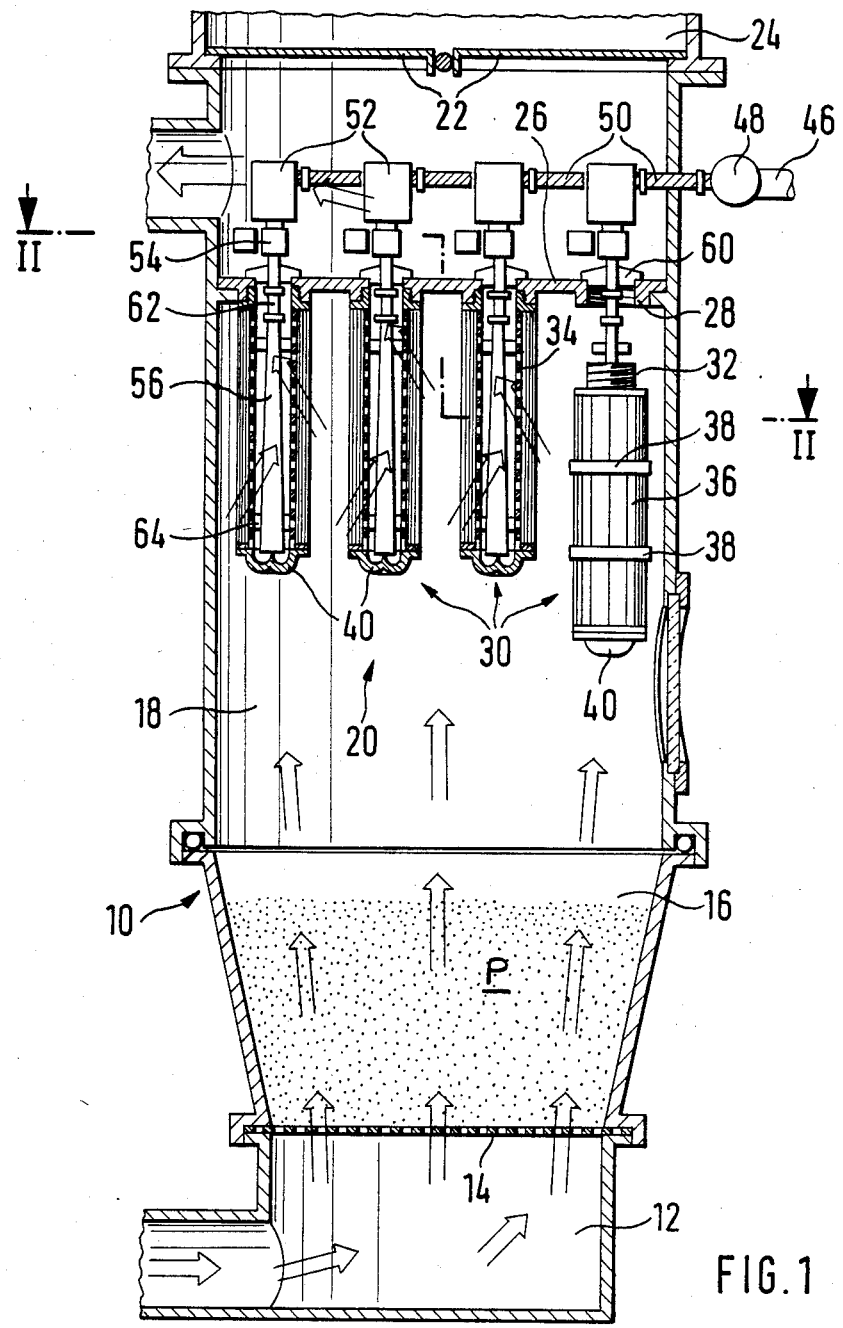
FIG. 1 is an axial sectional elevation of a fluidized bed apparatus including a filter assembly according to the invention.
Figure 2:
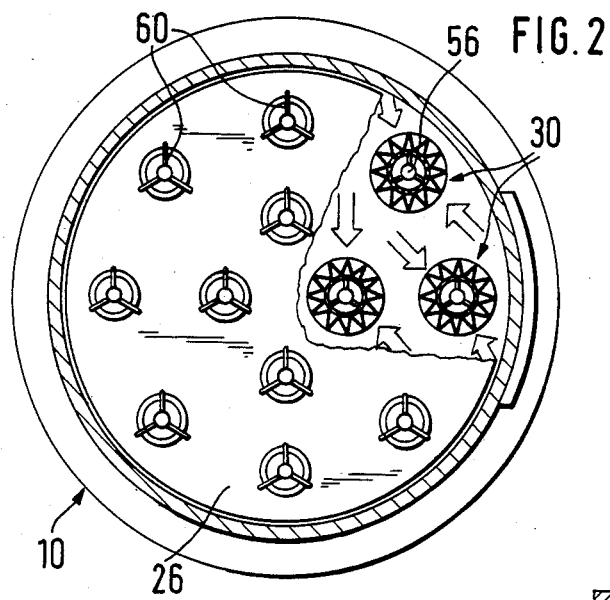
FIG. 2 is a cross section along line II—II in FIG. 1.

The fluidized bed apparatus shown in FIG. 1 comprises a shaft-like vessel 10 having an inlet chamber 12 at the bottom through which a gas, such as heated dry air is admitted by means of a fan (not shown) so as to establish a fluidized bed. The inlet chamber 12 is separated from a treatment chamber 16 located on top by a screen 14. In the treatment chamber 16 a product P is subjected to fluidized bed treatment, such as being granulated, coated, and/or dried.

The treatment chamber 16 is frustoconically enlarged in upward direction and merges into a cylindrical filtering chamber 18 containing a filter assembly 20 and being separated by explosion doors 22 from an expansion chamber 24. The filter assembly 20 frees the gas used for the formation of the fluidized bed from any dust particles originating from the product P before the gas is discharged out of the filtering chamber 18.

The filter assembly 20 comprises a partition 26 formed with a greater number, twelve in the embodiment shown, of circular openings, each surrounded by a collar 28 which protrudes in downward direction. A filter cartridge 30 is fixed to each collar 28.

Each filter cartridge 30 includes a supporting ring 32 formed with an external thread and threaded into the corresponding collar 28 as well as a cylindrical cage 34 which is secured to the respective supporting ring 32, extends vertically downwardly, and is made of mesh-like perforated sheet metal in the embodiment shown but might also be embodied by a grid of plastics, wire mesh, or the like.

Figure 4:
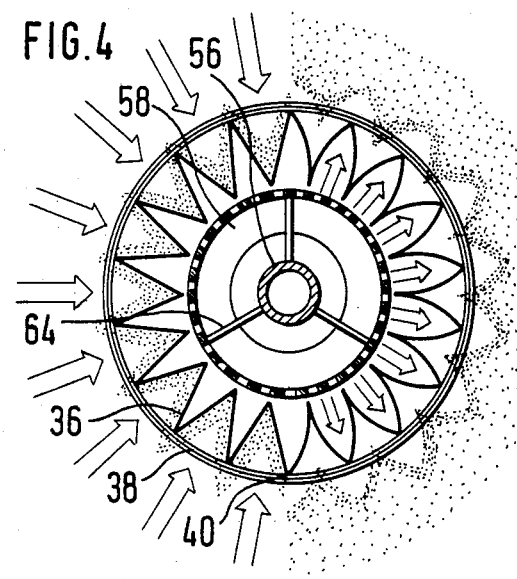
FIG. 4 is cross section along lines IV—IV in FIG. 3 on a more enlarged scale, the left half showing a state of normal operation of the fluidized bed apparatus and the right half showing a state during dust removal.

The cage 34 is surrounded by a filter hose 36 made of paper, textile fabric, or the like and so arranged in the embodiment shown that it is pleated to provide a stellar cross section, as may be taken above all from the left half of FIG. 4. Bandages 38 prevent the filter hose 36 from separating from the cage 34.

A deflecting member 40 is fixed to the lower end of the cage 34 of each filter cartridge 30. In the embodiment shown it is presented as a deep dish of the type of ring-shaped pound cake tin and it has a central bottom area formed with an upwardly directed tip 42 in the middle and a cylindrical outer jacket portion 44.

The jacket portion 44 is corrugated to follow the pleating of the filter hose 36 and, therefore, also has a stellar cross section.

A gas conduit 46 connecting a compressor (not shown) to a distributor 48 is associated with the filter assembly 20. Twelve pressure reservoirs 52 each coordinated with a corresponding filter cartridge 30 and disposed coaxially with the same above the partition 26 are connected individually by a hose 50 each to the distributor 48.

A vertical immersion tube 56 is connected with the pressure reservoir 52 by an electromagnetically operable valve 54 arranged directly under the pressure reservoir. Each immersion tube 56 extends downwardly in coaxial relation with the corresponding filter cartridge 30 and flares like a trumpet terminating at the level of the tip 42 of the respective deflecting member 40. The jacket portion 44 of the deflecting member 40 extends upwardly beyond the lower end of the immersion tube 56 together with which it defines an annular gap 58 having a cross sectional area which is approximately in agreement with the inner cross sectional area of the immersion tube 56 at the end thereof.

Figure 3:
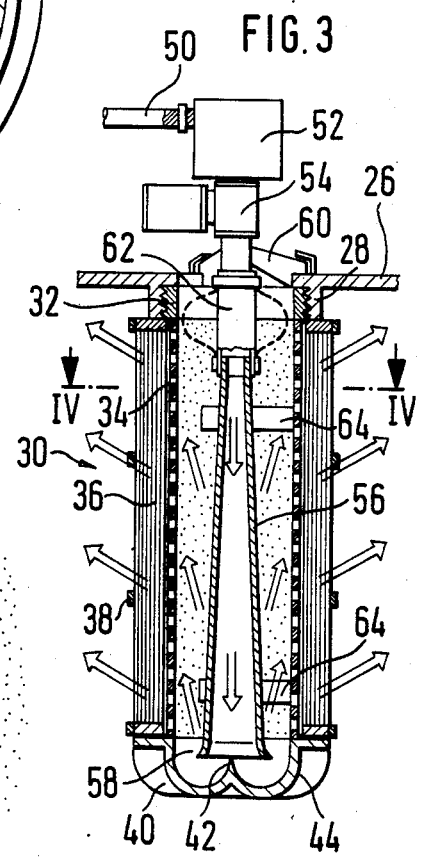
FIG. 3 is an enlarged detail of FIG. 1.

Each immersion tube 56 is supported at the partition 26 by a crown of three webs 60. A bellows 62 adapted to be blown up elastically is disposed on each immersion tube 56 below the webs 60 and within the supporting ring 32. FIG. 3 shows the bellows in relaxed condition in full lines and in blown up condition in discontinuous lines. In the embodiment shown the bellows 62 forms part of the immersion tube 56 itself whereby the pressure introduced into the immersion tube always is effective at once in the bellows 62.

The trumpet-like portion of the immersion tube 56 located below the bellows 62 is supported at the cage 34 by two crowns of three spokes 64 each so that the immersion tube always is held coaxial with the cage.

Figure 5:
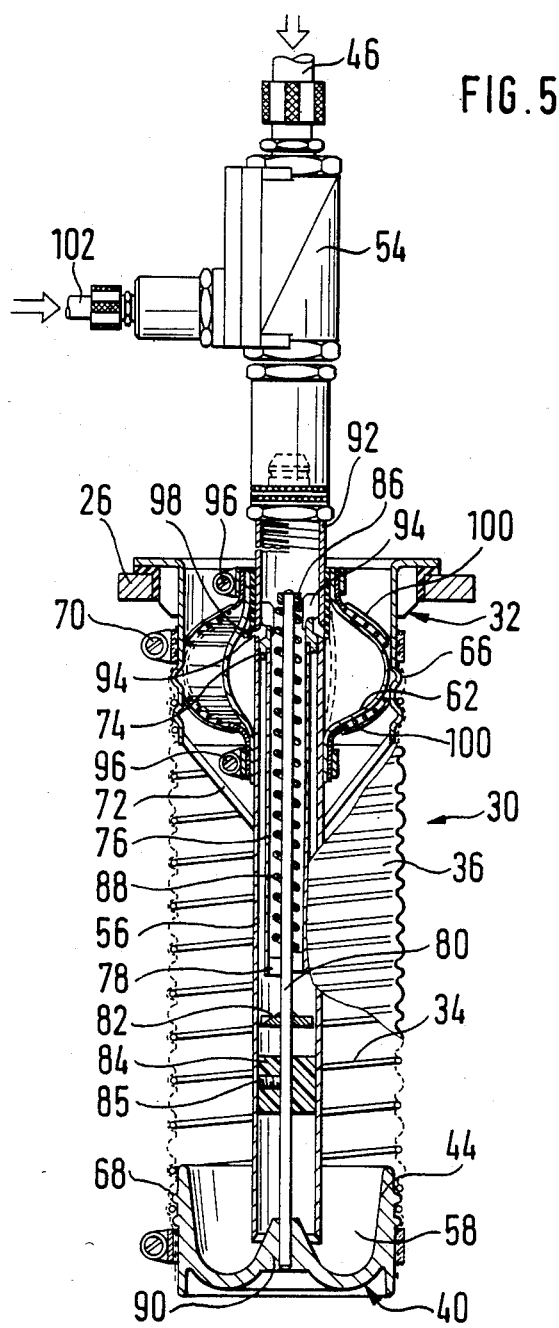
FIG. 5 is an axial sectional elevation corresponding to FIG. 3 and showing a further embodiment of the invention.

FIG. 5 shows a filter cartridge 30 which largely conforms with the one shown in FIG. 3. For this reason the same reference numerals are used as in FIG. 3 for corresponding structural elements and only differences will be discussed in greater detail below.

The filter cartridge 30 according to FIG. 5 includes a supporting ring 32 which is embodied by a sheet metal piece of short pipe provided with a thread 66 at its lower end and suspended from the partition 26. The cage 34 is formed by a helical spring attached by screwing on the thread 66. The deflecting member 40 is formed with an external thread 68 for screw connection with the lower end of the cage 34. The filter hose 36 is a length of a prefabricated hose and pushed over the deflecting body 40 to surround the cage 34 in loose, corrugated shape, being tightly secured to the supporting ring 32 and to the deflecting member 40 by a hose clip 70 each.

As shown in FIG. 5, the immersion tube 56 is generally cylindrical and fixed to the supporting ring 32 by inclined struts 72. A threaded ring 74 is screwed into the upper end of the immersion tube 56 and is adjustable in level. A supporting tube 76 extending coaxially down inside the immersion tube 56 and having internal guiding fins 78 at its lower end is secured to the threaded ring 74. The guiding fins 78 guide a piston rod 80 which passes axially through the supporting tube 76 and the immersion tube 56 and is guided in the immersion tube 56 by an apertured disc 82 and a sealingly acting piston 84. The piston 84 is made of low-friction plastics such as polyamide and is clamped to the piston rod 80 by a setscrew 85.

At its upper end the piston rod 80 is screw connected to a head piece 86 and at its lower end to the deflecting member 40. Inside the supporting tube 76 a compression spring 88 is seated between the head piece 86 and the guide fins 78 and tends to hold the piston rod 80 with the piston 84 and deflecting member 40 attached to it in the inoperative position shown. Instead of the tip 42 shown in FIG. 3 the deflecting member 40 is provided in its central area with a truncated cone 90 which engages the lower end of the immersion tube 56 with radial clearance, defining an annular gap with the same, when in the inoperative position.

A connecting tube 92 is centered on the threaded ring 74 and so supported that an annular gap 94 is left, the dimension of which depends on the adjustment of the threaded ring 74. The annular gap 94 is enclosed by the bellows 62 which is fixed tightly at its upper end to the connecting tube 92 and at its lower end to the immersion tube 56 by a hose clip 96 each. The annular gap 94 is covered by a valve-like elastomer sleeve 98 which likewise is retained on the connecting tube 92 by the hose clip 96. The bellows 62 is protected against bursting by an outside basket 100 each secured to the two hose clips 96.

During normal filter operation of the filter cartridge 30 according to FIG. 5 the bellows 62 is in an inoperative position which is indicated in discontinuous lines in FIG. 5 and in which it abuts closely to the sleeve 98, the latter closing the annular gap 94. Gas to be filtered flows from the filtering chamber 18 (FIG. 1) through the filter hose 36 into the interior of the filter cartridge 30. During this process dust deposits on the outside surface of the filter hose 36, while the gas relieved of the dust flows out unobstructedly in upward direction all around the immersion tube 56.

From time to time air is introduced into the connecting tube 92 through the valve 54 so as to shake off the dust from the filter hose 36. As shown in FIG. 5, the valve 54 is controlled pneumatically through a control conduit 102. The pressurized air urges the sleeve 98 outwardly and flows through the annular gap 94 into the bellows 62 to blow up the same. Successive stages of blow-up are demonstrated by full lines in the right and left halves of FIG. 5. At the same time the pressurized air flows down through the supporting tube 76 into the immersion tube 56, passing through the disc 82 to reach the piston 84.

As soon as the force of the air pressure acting on the piston 84 overcomes the compression spring 88, the deflecting member 40 is lowered and the truncated cone 90 moves out of the immersion tube 56, the filter hose 36 slowly being stretched against the rather weak resistance of the helical spring forming the cage 34. This will momentarily create low pressure inside the filter hose 36 because the blown up bellows 62 lies more or less closely against the supporting ring 32, thereby preventing air from being sucked from above while the piston 84 still holds back the compressed air in the immersion tube 56.

Further downward movement of the piston 84 including the piston rod 80 and the deflecting member 40 causes the piston 84 to move out of the immersion tube 56 so that compressed air will flow out. In greatly stretched state the filter hose 36 will be blown up instantaneously because the bellows 62 still blown up prevents air from escaping upwardly or at least makes it very difficult because of its throttling action. As soon as the piston 84 has come out it is subjected only to a pressure head which is insufficient to keep the compression spring 88 in compressed state. As a consequence, the piston rod 80 including the disc 82, the piston 84, and the deflecting member 40 again moves upwards whereby the pressure inside the immersion tube 56 again rises, urging the piston 84 downwards once more. In this manner vibrations are produced which cause periodic tightening and relaxation of the filter hose 36 so that any collections of dust on its outside are shaken off vigorously.

Upon loosening of the setscrew 85 the piston 84 is adjustable along the piston rod 80 so that the desired extent of vibrations is obtained. It is also conceivable to vary the bias of the compression spring 88 by adjusting the head piece 86 in order to achieve the same effect. The diameter of the immersion tube 56 and thus also the diameter of the piston 84 may be greater as compared to the diameter of the filter hose 36 than illustrated in FIG. 5. This will give the piston 84 a correspondingly greater effective area so that vibrations described will occur even at relatively low pressure of the pressurized air introduced through the valve 54.

The valve 54 remains open for no more than about one second. When it is closed again, the bellows 62 gradually collapses in about two seconds. The valve-like sleeve 98 at any rate delays the collapse of the bellows 62 such that the filter hose 36 is blown up as described and consequently freed of any filter residues adhering to its outside.

As soon as the valve 54 has been closed again and the bellows is collapsed, the filter cartridge begins another filtration cycle. The product continues to be treated uninterruptedly in the fluidized bed since the valves 54 are so controlled that they open and close one after the other and that the opening times of two successive valves in time do not overlap or, if so, only slightly.

What is claimed is:

1. A filter assembly for removal of dust from gases, comprising one or more filter cartridges, said filter cartridge being a substantially hollow tube which is closed at one end and open at the other end, comprising a filter hose, and a supporting ring, said supporting ring being located at the opened end of the filter cartridge; and one or more valves adapted for connection with a source of compressed gas; and for each each filter cartridge a hollow immersion tube, said immersion tube being suspended within the filter cartridge such that the axis of the immersion tube is substantially parallel to the axis of the filter cartridge, and such that one end of the immersion tube is close to the closed end of the filter cartridge, said immersion tube being connected at the end near the open end of the filter cartridge to one of the valves, said valve in the open position allowing gas to flow through the immersion tube; and a dimensionally stable deflecting member positioned opposite the immersion tube at the closed end of the filter cartridge;

a bellows, said bellows being attached to the immersion tube near the end of the immersion tube to which the valve is connected in a manner such that gas flowing through the immersion tube will inflate the bellows and such that when inflated, the bellows presses against the interior walls of the filter cartridge, substantially closing off the open end of the filter cartridge.

2. A filter assembly according to claim 1, wherein the deflecting member is connected to the the supporting ring by a cage, said cage being rigid in the radial direction and providing support for the filter hose.

3. A filter assembly according to claim 2, wherein the cage is rigid in the axial direction such that it maintains the position of the deflecting member relative to the immersion tube.

4. A filter assembly according to any one of claims 1-3, wherein the deflecting member is suspended from the filter hose.

5. A filter assembly according to claim 2, wherein the cage is formed by a helical spring encased by the filter hose, such that the deflecting member is axially reciprocable with respect to the immersion tube.

6. A filter assembly according to claim 5, further comprising guide means for limiting the axial displacement of the deflecting member relative to the immersion tube.

7. A filter assembly according to claim 6; wherein the guide means comprises a piston rod, said piston rod being firmly connected to the deflicting member and slidably disposed within the immersion tube.

8. A filter assembly according to claim 7, further comprising a piston mounted on the piston rod at a point on piston rod such that the piston slides between an inoperative position within the immersion tube and an operative position, the inoperative position being characterized by the piston acting to seal the immersion tube and prevent gas flow through the immersion tube, and the operative position being characterized by a piston position which allows gas flow through the immersion tube.

9. A filter assembly accordingly to claim 8, wherein the piston in the operative position is entirely removed from the immersion tube.

10. A filter assembly according to claim 8 or 9, further comprising means for vibrating the piston and the deflecting member in an axial direction relative to the immersion tube.

11. A filter assembly according to claim 10, wherein the means for vibrating the piston and the deflecting member is one or more springs.

12. A filter assembly according to claim 11, wherein the spring is coiled around the part of the piston rod which is separated form the deflecting member by the piston.

13. A filter assembly according to claim 10, wherein the deflecting member has an outer jacket portion which is at least approximately cylindrical and which, together with the end of the immersion tube defines an annular gap.

14. A filter assembly according to claims 1, 2, 3, 5, 6, 7, 8, or 9, wherein the deflecting member comprises a dish arranged coaxially with the immersion tube.

15. A filter assembly according to claim 4, wherein the deflecting member further comprises a truncated cone disposed in the center bottom of the dish and directed axially toward the immersion tube.

16. A filter assembly according to claim 1, 2, 3, 5, 6, 7, 8, or 9, wherein the valves associated with each filter cartridge are cyclically fed successively with gas.

17. A filter assembly according to claim 16, further comprising a pressure reservoir located immediately upstream from each valve.

18. A filter assembly for removal of dust from gases, comprising one or more filter cartridges, each filter cartridge being a substantially hollow tube which is closed at one end and open at the other end, comprising
(a) an axially extendable filter hose,
(b) a supporting ring, said supporting ring being located at the open end of the filter cartridge,
(c) a dish shaped deflecting member disposed inside the filter cartridge at the closed end,
(d) a piston rod affixed to the center of the deflecting member and disposed axially within the filter cartridge,
(e) a spring coiled around the piston rod and affixed to the end remote from the deflecting member, and
(f) a piston affixed to the piston rod at a point between the free end of the spring and the deflecting member; and one or more valves adapted for connection with a source of compressed gas; and for each filter cartridge a hollow immersion tube, said immersion tube having internal guide means and being suspended within the filter cartridge such that the piston rod is slidably disposed within the immersion tube, the spring being on one side of the internal guide means and the piston being on the other side of the internal guide means, and such that one end of the immersion tube is closed to the closed end of the filter cartridge, said immersion tube being connected at the end near the open end of the filter cartridge to one of the valves, said valve in the open position allowing gas to flow through the immersion tube;

a bellows, said bellows being attached to the immersion tube near the end of the immersion tube to which the valve is connected in a manner such that gas flowing through the immersion tube will inflate the bellows and such that when inflated, the bellows presses against the interior walls of the filter cartridge, substantially closing off the open end of the filter cartridge, wherein the piston moves between an inoperative position within the immersion tube to an operative position, the inoperative position being characterized by the piston acting to seal the immersion tube and prevent gas flow through the immersion tube, and the operative position being such that gas can flow through the immersion tube.

19. filter assembly for removal of dust from gases, comprising
- one or more filter cartridges, said filter cartridge being a substantially hollow tube which is closed at one end and open at the other end, comprising an axially extendable filter hose, and a supporting ring, said supporting ring being located at the open end of the filter cartridge; and
- one or more valves adapted for connection with a source of compressed gas; and for each filter cartridge
- a hollow immersion tube, said immersion tube being suspended within the filter cartridge such that the axis of the immersion tube is substantially parallel to the axis of the filter cartridge, and such that one end of the immersion tube is close to the closed end of the filter cartridge, said immersion tube being connected at the end near the open end of the filter cartridge to one of the valves, said valve in the open position allowing gas to flow through the immersion tube; and
- a dimensionally stable deflecting member positioned opposite the immersion tube at the closed end of the filter cartridge, wherein flow of gas through the immersion tube into the filter cartridge causes the axial extension of the filter hose.

20. A filter assembly according to claim 19, wherein the deflecting member is connected to the supporting ring by a cage, said cage being rigid in the radial direction and providing support for the filter hose.

21. A filter assembly according to claim 19 or 20, wherein the deflecting member is suspended from the filter hose.

22. A filter assembly according to claim 20, wherein the cage is formed by a helical spring encased by the filter hose, such that the deflecting member is axially reciprocable with respect to the immersion tube.

23. A filter assembly according to claim 22, further comprising guide means for limiting the axial displacement of the deflecting member relative to the immersion tube.

24. A filter assembly according to claim 23, wherein the guide means comprises a piston rod, said piston rod being firmly connected to the deflecting member and slidably disposed within the immersion tube.

25. A filter assembly according to claim 24, further comprising a piston mounted on the piston rod at a point on piston rod such that the piston slides between an inoperative position within the immersion tube and an operative position, the inoperative position being characterized by the piston acting to seal the immersion tube and prevent gas flow through the immersion tube, and the operative position being characterized by a piston position which allows gas flow though the immersion tube.

26. A filter assembly according to claim 25, wherein the piston in the operative position is entirely removed from the immersion tube.

27. A filter assembly according to claim 25 or 26, further comprising means for vibrating the piston and the deflecting member in an axial direction relative to the immersion tube.

28. A filter assembly according to claim 27, wherein the means for vibrating the piston and the deflecting member is one or more springs.

29. A filter assembly according to claim 28, wherein the spring is coiled around the part of the piston rod which is separated from the deflecting member by the piston.

30. A filter assembly according to claim 29, wherein the deflecting member has an outer jacket portion which is at least approximately cylindrical and which, together with the end of the immersion tube defines an annular gap.

31. A filter assembly according to claim 19, 20, 22, 23, 24, 25, or 26, wherein the deflecting member comprises a dish arranged coaxially with the immersion tube.

32. A filter assembly according to claim 31 wherein the deflecting member further comprises a truncated cone disposed in the center bottom of the dish and directed axially toward the immersion tube.

33. A filter assembly according to claim 19, 20, 22, 23, 24, 25, or 26, wherein the valves are cyclically fed successively with gas.

34. A filter assembly according to claim 33, wherein each valve has a pressure reservoir connected immediately upstream thereof.

35. A filter assembly for removal of dust from gases, comprising
- a filter cartridge having opposite ends and a filter hose arranged between said opposite end, wherein said filter cartridge has a substantially hollow interior and is closed at one end and open at the other end, and wherein the open end has an interior wall;
- a valve adapted for connection with a source of compressed gas;
- a hollow immersion tube, connected to said valve and extending through said open end into the filter cartridge interior, said valve in the open position allowing gas to flow through the immersion tube into said filter cartridge interior; and
- a dimensionally stable deflecting member positioned opposite the immersion tube at the closed end of the filter cartridge;
- wherein said hollow immersion tube includes a bellows located in said open end such that gas flowing through the immersion tube will inflate the bellows and such that, when inflated, the bellows presses against the interior wall of the filter cartridge, substantially closing off the open end.

36. A filter assembly for removal of dust from gases, comprising
- a filter cartridge having opposite ends and an axially extendable filter hose arranged between said opposite ends, wherein said filter cartridge has a substantially hollow interior and is closed at one end and open at the other end,
- a valve adapted for connection with a source of compressed gas;
- a hollow immersion tube connected to said valve and being suspended within the filter cartridge such that the outlet end of the immersion tube is close to the closed end of the filter cartridge, said valve in the open position allowing gas to flow through the immersion tube; and deflecting member means, positioned at the outlet end of the immersion tube and removable responsive to the flow of gas through the immersion tube, said means being coupled to said filter cartridge for causing the axial extension of the filter hose responsive to the flow of gas through the immersion tube into the filter cartridge.

* * * * *